June 20, 1944.   S. M. BOOTH   2,351,741
METHOD AND MEANS FOR MOUNTING TOOLS
Filed Oct. 30, 1941
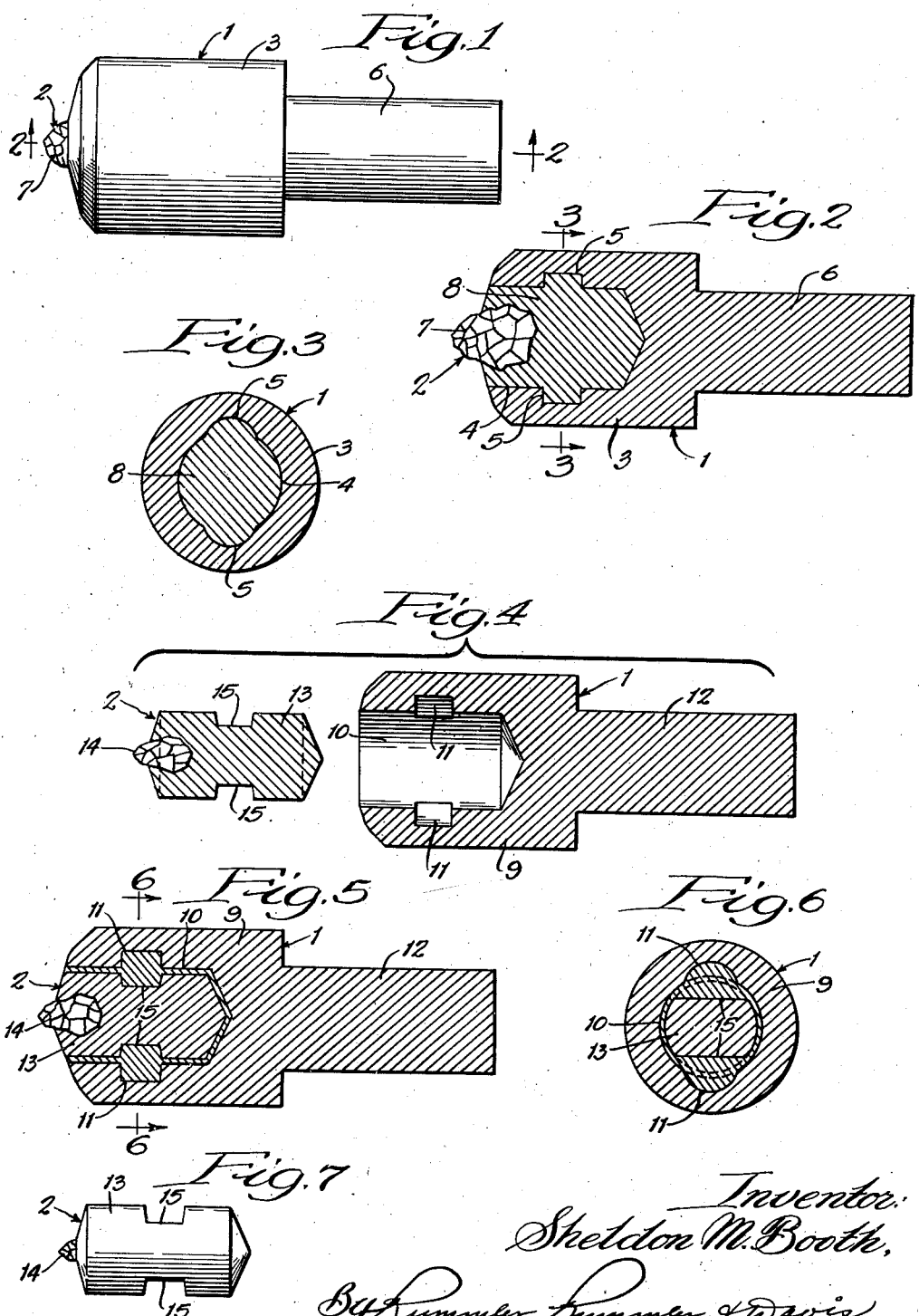
Inventor.
Sheldon M. Booth, Patented June 20, 1944

2,351,741

UNITED STATES PATENT OFFICE 2,351,741

METHOD AND MEANS FOR MOUNTING TOOLS

Sheldon M. Booth, Chicago, Ill.

Application October 30, 1941, Serial No. 417,091

4 Claims. (Cl. 125—39)

This invention relates to improvements in core and socket connections and the specific construction to which the invention is directed, though not intended to be so limited, is for improvements in diamond dressing tools and still more particularly to a method and means for holding the tool in the holder so as to prevent the tool from working itself loose in the holder.

Diamond dressing tools usually consist of a tool holder having a socket and a tool, the non-working end of which is held in the socket by the use of a bonding material.

Diamond dressing tools are subjected to a great deal of strain and abuse when in use and unless the tool is securely retained within the holder, the tolerance is destroyed. In tools of this character, accuracy is of prime importance; hence it is absolutely essential that the tool be securely retained within the holder.

Dressing tools of this character are primarily employed to dress emery and other grinding wheels; hence, a great deal of heat is generated during the dressing operation. Most of this heat is transmitted to the tool and holder and if great enough, and this could happen by improper and careless setting of the dressing tool, the bonding material becomes soft and the tool loosened from its setting.

It was to produce a dressing tool wherein the tool is more securely anchored in the holder that the present invention was designed.

An illustrative embodiment of this invention is shown in the accompanying drawing, in which:

Figure 1 shows a side elevation of a diamond dressing tool.

Fig. 2 is a cross-sectional view taken on the line 2—2 of Fig. 1.

Fig. 3 is a cross-sectional view taken on the line 3—3 of Fig. 2.

Fig. 4 is a cross-sectional view of a modified form of tool and holder.

Fig. 5 is a cross-sectional view of the diamond dressing tool shown in Fig. 4 but in assembled position.

Fig. 6 is a cross-sectional view taken on the line 6—6 of Fig. 5.

Fig. 7 is a side elevational view of the tool shown in Fig. 4.

The main objects of this invention are to provide an improved method and means of securing a core in a socket; to provide an improved method and means of joining two metallic members together; to provide an improved method of fixing a tool in a holder; to provide an improved diamond dressing tool; to provide an improved method of casting a key in a keyway contained in a socket or a holder; to provide method of securing two concentric articles together; to provide an improved tool and holder; and to provide an improved article of manufacture which is simple in construction and inexpensive to manufacture.

Referring in detail to the drawing, the diamond dressing tool shown comprises a tool holder 1 usually constructed of cold drawn steel and a tool 2. The tool holder 1 is cylindrical in shape and is enlarged at one end to form a head 3 which is provided with a socket 4 having keyways 5 milled therein. The tool holder 1 is also provided with a stem or shank 6.

The tool 2 illustrated herein is a diamond 7. In Figs. 1 to 3, the manner of fixing the diamond 7 in the socket 4 is as follows:

The shank 6 of the tool holder is first placed in any suitable apparatus (not illustrated) so that the head 3 extends upwardly. Next a bonding material such as a solder, copper, brass or the like 8 is melted and poured into the socket 4 and allowed to cool. While the bonding material 8 is still plastic, the diamond 7 is seated therein and by means of pressure applied with a die, the diamond 7 is centered in the tool holder and the bonding material pressed into the socket to displace the material and completely fill the socket 4 and the keyways 5. The tool and holder is then cooled to freeze the bonding material and fix the tool in the holder.

In the embodiment shown in Figs. 4 to 7, the tool holder is identical to the one used in and illustrated in Figs. 1 to 3, hence the numerals 9, 10, 11 and 12 correspond to the like elements 3, 4, 5 and 6, of Figs. 1 to 3. The tool comprises a cylindrical body 13 produced from Swedish steel or other metal having a high melting point, and having a diamond 14 set in one end. A pair of grooves 15 are cut in the side walls of the body 13 intermediate the ends thereof and opposite each other to form keyways. The keyways 15 are so arranged that when the tool is set in the socket 10, they will be in alinement with the keyways 11 of the socket side wall.

To secure the tool in the socket, a predetermined amount of bonding material, such as a solder, copper, brass or the like 16, is melted and poured into the socket 10, allowed to cool while the material is still plastic, the tool 2 of Figs. 4 to 7 is inserted into the socket 10, preferably under pressure, so as to displace the material 16 and completely fill the area around the tool 2 and the keyways 11 and 15. The tool and holder are then preferably chilled to fix the tool in the holder.

It can readily be seen that any number of keyways 5, 11 or 15 may be employed without departing from the spirit of this invention, and that the non-working ends of any tool, such as screw drivers, chisels and the like, may readily be substituted for diamond tool 2 illustrated herein. Also two concentric articles may be secured together by employing the method herein described. It can be also be readily understood from the foregoing description that the sockets 4 and 10 act as molds upon the pouring of the bonding material thereinto and the bonding material forms a key upon freezing.

In the diamond dressing tool industry, the bonding material 8 and diamond 7, and the member 13 and diamond 14 are termed slugs, and holder 1 is referred to as a nib.

Although but two specific embodiments are herein shown and described, it is to be understood that some of the details set forth may be altered or omitted without departing from the spirit of the invention as defined by the following claims.

I claim:

1. The method of fixing a tool in a holder socket which consists in forming keyways in the socket side wall of a holder, filling said socket with plastic metal, setting the tool into said socket while the metal therein is still plastic, cooling said metal, then centering said tool with respect to said socket and applying pressure to said tool and metal while it is still plastic and thereby displacing said metal to substantially fill said socket and keyways.

2. The method of fixing a tool in a holder socket which consists in forming keyways in the socket side wall of a holder, partially filling said socket with plastic metal, setting the tool into said socket while the metal therein is still plastic, cooling said metal, then centering said tool with respect to said socket and applying pressure to said tool and metal while it is still plastic and thereby displacing said metal to substantially fill said socket and keyways.

3. The method of securing a core in a socket which consists in forming keyways in the socket side wall, flowing a predetermined amount of plastic metal in said socket, setting the core in said socket while the metal is still plastic, thereby displacing said metal to substantially fill said socket and keyways, and then freezing said metal to fix said core in said socket while applying pressure to said core.

4. The method of fixing a tool in a holder socket of a tool holder which consists in forming a keyway in the side wall of the socket transversely of the axis of the tool holder, flowing a predetermined amount of plastic bonding metal into said socket, setting and centering a diamond directly in the bonding metal by means of pressure applied with a die while the bonding metal is in a plastic condition and thereby displacing said bonding metal and filling the socket and keyway, and then freezing said bonding metal to fix the diamond in said socket.

SHELDON M. BOOTH.